(12) United States Patent
Zhou et al.

(10) Patent No.: US 11,638,416 B2
(45) Date of Patent: May 2, 2023

(54) LIVESTOCK TRACING SYSTEM AND METHOD

(71) Applicant: Beijing Etag Technology Company., Ltd., Beijing (CN)

(72) Inventors: Xingfu Zhou, Beijing (CN); Jiping Ren, Beijing (CN); Chao Pang, Beijing (CN); Dongge Hu, Beijing (CN)

(73) Assignee: Beijing Etag Technology Company., Ltd., Beijing (CN)

( * ) Notice: Subject to any disclaimer, the term of this patent is extended or adjusted under 35 U.S.C. 154(b) by 654 days.

(21) Appl. No.: 16/597,028

(22) Filed: Oct. 9, 2019

(65) Prior Publication Data

US 2020/0214262 A1 Jul. 9, 2020

(30) Foreign Application Priority Data

Jan. 8, 2019 (CN) .......................... 201910015061.8

(51) Int. Cl.
*A01K 5/02* (2006.01)
*A01K 13/00* (2006.01)
*A01K 29/00* (2006.01)
*A01K 11/00* (2006.01)
*A61D 7/00* (2006.01)
(Continued)

(52) U.S. Cl.
CPC ............ *A01K 29/00* (2013.01); *A01K 11/004* (2013.01); *A61D 7/00* (2013.01); *G06Q 50/02* (2013.01); *G06Q 10/06395* (2013.01); *G06Q 10/087* (2013.01); *G06Q 30/0185* (2013.01)

(58) Field of Classification Search
CPC ........ A01K 29/00; A01K 11/004; A61D 7/00; G06Q 50/02; G06Q 10/06395; G06Q 10/087; G06Q 30/0185
See application file for complete search history.

(56) References Cited

U.S. PATENT DOCUMENTS

| 5,740,757 A | * | 4/1998 | Smeester | ............ A01M 13/00 |
| | | | | 119/51.02 |
| 2006/0130777 A1 | * | 6/2006 | Adams | ................ A01K 11/006 |
| | | | | 119/843 |

(Continued)

FOREIGN PATENT DOCUMENTS

CN 109508967 A * 3/2019 ........... A01K 11/004

*Primary Examiner* — Talia F Crawley
(74) *Attorney, Agent, or Firm* — Bayramoglu Law Offices LLC

(57) ABSTRACT

The present invention discloses a livestock tracing system and method. The system includes: a feeding module, an adopting and purchasing module, a weighing module, a server, a first commutation module and a second communication module; the feeding module is configured to provide food intake information of livestock and transmit the food intake information to the server via the first communication module; the weighing module is configured to provide weight information of the livestock and transmit the weight information to the server via the second communication module; the adopting and purchasing module is configured to provide vaccine information of the livestock and transmit the vaccine information to the server; and the server is configured to store the food intake information, the weight information and the vaccine information, and obtain corresponding tracing information according to a tracing look-up instruction.

20 Claims, 5 Drawing Sheets

(51) Int. Cl.
*G06Q 50/02* (2012.01)
*G06Q 10/0639* (2023.01)
*G06Q 10/087* (2023.01)
*G06Q 30/018* (2023.01)

(56) References Cited

U.S. PATENT DOCUMENTS

| | | | | |
|---|---|---|---|---|
| 2008/0059534 | A1* | 3/2008 | Stroman | G06Q 10/08 |
| 2009/0038552 | A1* | 2/2009 | Baker | A01K 67/02 |
| | | | | 119/14.03 |
| 2009/0115578 | A1* | 5/2009 | Geissler | A01K 11/006 |
| | | | | 340/10.1 |
| 2009/0164234 | A1* | 6/2009 | Sinn | G06Q 10/083 |
| | | | | 119/845 |
| 2010/0277280 | A1* | 11/2010 | Burkart | H04Q 9/00 |
| | | | | 340/10.1 |
| 2010/0277283 | A1* | 11/2010 | Burkart | G06Q 10/00 |
| | | | | 340/10.3 |
| 2010/0277285 | A1* | 11/2010 | Anderson | H04Q 9/00 |
| | | | | 340/10.4 |
| 2010/0277286 | A1* | 11/2010 | Burkart | G06K 19/0701 |
| | | | | 340/10.34 |
| 2013/0018761 | A1* | 1/2013 | Kwak | G06Q 30/0201 |
| | | | | 705/26.61 |
| 2017/0006826 | A1* | 1/2017 | Torres | A01K 13/003 |
| 2018/0303063 | A1* | 10/2018 | Davis | G01S 19/14 |
| 2019/0053470 | A1* | 2/2019 | Singh | A01K 11/004 |

\* cited by examiner

LIVESTOCK TRACING SYSTEM AND METHOD

TECHNICAL FIELD

The present invention relates to the field of tracing, and in particular, to a livestock tracing system and method.

BACKGROUND

At present, the demand on quality of food such as livestock is increasingly higher in daily life. However, in real transaction, the information of the livestock is counterfeited easily and is unreliable; and the data of an existing tracing system may be intervened manually and has a risk of being tampered manually, so that an authentic meaning of the tracing is lost. Therefore, it is necessary to provide a tracing system with authentic and reliable data to solve the above problems in the prior art.

SUMMARY

An objective of the present invention is to provide a livestock tracing system and method, to prevent data from being tampered manually.

To achieve the above objective, the present invention provides the following solutions.

A livestock tracing system includes: a feeding module, an adopting and purchasing module, a weighing module, a server, a first communication module and a second communication module, where the feeding module is configured to provide food intake information of livestock and transmit the food intake information to the server via the first communication module;

the weighing module is configured to provide weight information of the livestock and transmit the weight information to the server via the second communication module;

the adopting and purchasing module is configured to provide vaccine information of the livestock and transmit the vaccine information to the server; and the server is configured to store the food intake information, the weight information and the vaccine information, and obtain corresponding tracing information according to a tracing look-up instruction.

Optionally, the first communication module specifically includes: a first input power interface, a first control box and a data transmission antenna; an input end of the first input power interface is connected to a power supply; an output end of the first input power interface is connected to an input end of the first control box; and an output end of the first control box is connected to the data transmission antenna.

Optionally, the second communication module specifically includes: a second input power interface, a second control box and a connection interface; an input end of the second input power interface is connected to a power supply; an output end of the second input power interface is connected to an input end of the second control box; an output end of the second control box is connected to an input end of the connection interface; and an output end of the connection interface is connected to the weighing module.

Optionally, the food intake information includes: a food intake amount of the livestock, the number of food intake times and food intake time.

Optionally, the vaccine information includes: injection varieties of vaccines, injection amounts of the vaccines and injection time of the vaccines.

The present invention further provides a livestock tracing method, which is applied to the above livestock tracing system and includes:

obtaining food intake information of livestock;
obtaining weight information of the livestock;
obtaining vaccine information of the livestock;
transmitting the food intake information of the livestock to a server via a first communication module for storage;
transmitting the weight information of the livestock to the server via a second communication module for storage;
transmitting the vaccine information of the livestock to the server for storage;
obtaining a tracing instruction; and
obtaining corresponding tracing information according to the tracing instruction.

Optionally, the food intake information of the livestock is obtained via a feeding module.

Optionally, the vaccine information of the livestock is obtained via an adopting and purchasing module.

Optionally, the weight information of the livestock is obtained via a weighing module.

According to specific embodiments provided in the present invention, the present invention discloses the following technical effects.

A feeding module, an adopting and purchasing module, a weighing module, a server, a first commutation module and a second communication module are provided in the present invention, where the feeding module is configured to provide food intake information of livestock and transmit the food intake information to the server via the first communication module, the weighing module is configured to provide weight information of the livestock and transmit the weight information to the server via the second communication module, the adopting and purchasing module is configured to provide vaccine information of the livestock and transmit the vaccine information to the server, and the server is configured to store the food intake information, the weight information and the vaccine information. In the present invention, the feeding module, the adopting and purchasing module and the weighing module transmit data with the server directly and there is no manual participation. Therefore, the data cannot be tampered and the authenticity of the data is guaranteed.

BRIEF DESCRIPTION OF THE DRAWINGS

To describe the technical solutions in the embodiments of the present invention or in the prior art more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION

The following clearly and completely describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

An objective of the present invention is to provide a livestock tracing system and method, to prevent data from being tampered manually.

To make the foregoing objective, features, and advantages of the present invention clearer and more comprehensible, the present invention is further described in detail below with reference to the accompanying drawings and specific embodiments.

Figure 1:
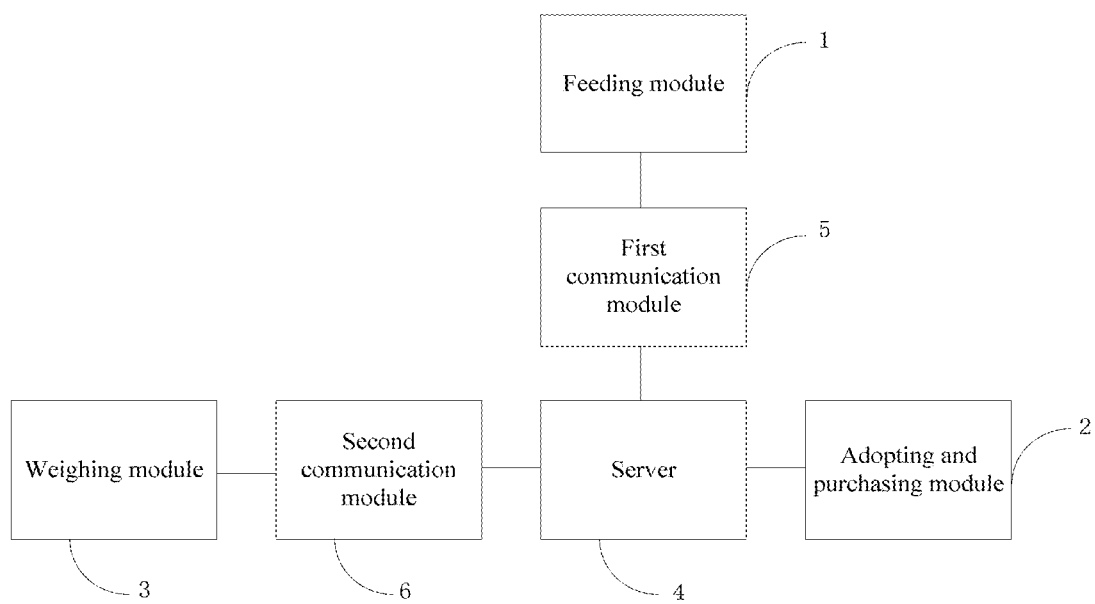
FIG. 1 is a schematic structural diagram of a livestock tracing system according to an embodiment of the present invention.

FIG. 1 is a schematic structural diagram of a livestock tracing system according to an embodiment of the present invention. As shown in FIG. 1, the system includes: a feeding module 1, an adopting and purchasing module 2, a weighing module 3, a server 4, a first communication module 5 and a second communication module 6.

The feeding module 1 is configured to provide food intake information of livestock and transmit the food intake information to the server via the first communication module 5; and the food intake information includes: a food intake amount of the livestock, the number of food intake times and food intake time.

The weighing module 3 is configured to provide weight information of the livestock and transmit the weight information to the server via the second communication module 6.

The adopting and purchasing module 2 is configured to provide vaccine information of the livestock and transmit the vaccine information to the server 4; and the vaccine information includes: injection varieties of vaccines, injection amounts of the vaccines and injection time of the vaccines.

The server 4 is configured to store the food intake information, the weight information and the vaccine information, and obtain corresponding tracing information according to a tracing look-up instruction.

Figure 2:
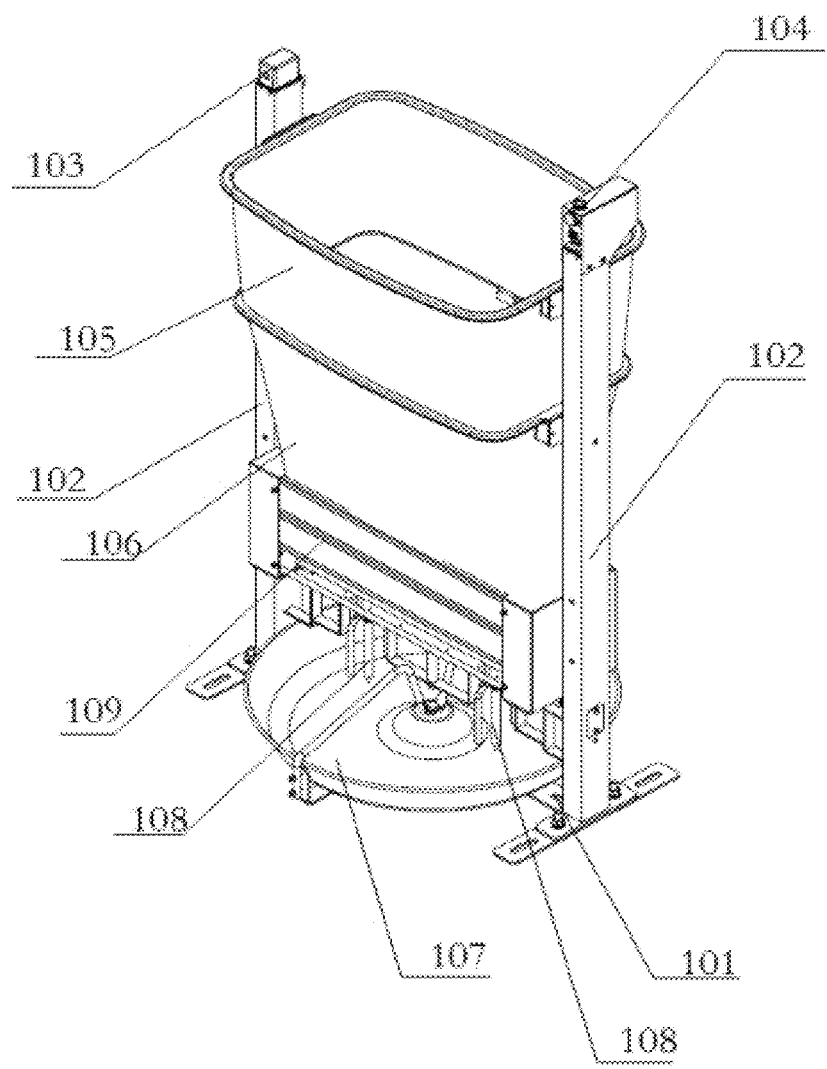
FIG. 2 is a schematic structural diagram of a feeding module according to an embodiment of the disclosure.

FIG. 2 is a schematic structural diagram of a feeding module according to an embodiment of the disclosure. As shown in FIG. 2, the feeding module specifically includes: a pedestal 101, support rods 102, a computer 103, an electromagnetic valve 104, a charging basket 105, a blanking mechanism 106 and a tray 107.

The support rods 102 are disposed on the pedestal 101, the electromagnetic valve 104 and the computer 103 are respectively disposed on upper ends of the support rods 102, the charging basket 105 is disposed on upper portions of the support rods 102 and is located below the electromagnetic valve 104, the blanking mechanism 106 is disposed below the charging basket 105, and the tray 107 is disposed below the blanking mechanism 106.

The electromagnetic valve 104 is configured to control water supply; the charging basket 105 is configured to store feed; the computer 103 is configured to control the blanking mechanism 106 to blank materials; the tray 107 is configured to feed poultry/livestock; the feeding module 1 further includes detection rods 108; and the detection rods 108 are disposed between the blanking mechanism 106 and the tray 107, are located on the support rods 102, and are configured to detect a residual amount of the feed in the tray. The feeding module 1 further includes a reader antenna 109 and ear tags; the reader antenna 109 is disposed on the blanking mechanism 106; the ear tags are worn on ears of the poultry/livestock; the reader antenna 109 is cooperatively used with the ear tags, and is configured to identify the ear tags; and the ear tags represent identity information of the poultry/livestock respectively, and the identity information is unique. By identifying the ear tags via the reader antenna 109, the specific number of food intake livestock may be obtained, and thus the blanking amount may be controlled and the historical data may be formed for reference.

According to a batch where the livestock are located, and ear tag numbers carried by the livestock in this batch and served as unique identifiers in a breeding file, an average weight of the livestock is known when the livestock in this batch are adopted and purchased. After the breeding is started in a lairage, the feed intake condition of each animal every day can be uploaded to the system via an intelligent device in real time. During the breeding process, the names, varieties and number of used vaccines can be obtained via an intelligent adopting and purchasing system; and then, by averaging to each animal, the vaccines and dosages of a pig in the breeding process are obtained, and this is also a case for veterinary drugs. When the livestock in this batch are slaughtered, a total weight of pigs in this batch is obtained by an intelligent weighing device and thus an average weight of the livestock may be calculated. In this way, factors of the livestock during the whole breeding period such as feed, drugs, vaccines and weights all can be recorded in the breeding file of the livestock; and at last, the system divides a file list for each animal, the file list includes the weight and usage conditions of the feed, vaccines and veterinary drugs, etc., and these data are authentic and accurate and may be completely announced.

Figure 3:
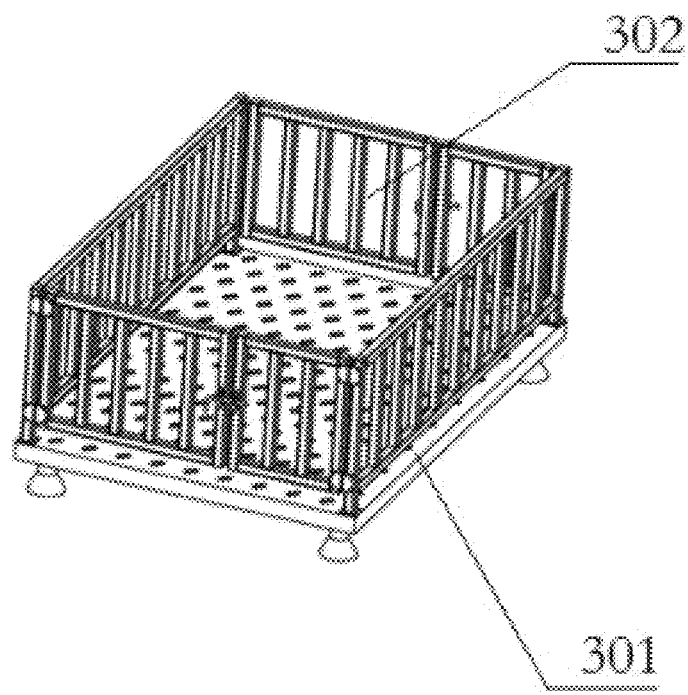
FIG. 3 is a schematic structural diagram of a weighing module according to an embodiment of the disclosure.

FIG. 3 is a schematic structural diagram of a weighing module according to an embodiment of the disclosure. As shown in FIG. 3, the weighing module 3 is an electronic scale and includes: an electronic scale body 301 and a fence 302; the fence 302 is disposed on the electronic scale body 301; and by driving the livestock to the fence to weigh the livestock and then transmitting the weighed data to the server 4 via the first communication module 5, the data are prevented from being intervened manually in the whole process, and thus the data are authentic and reliable.

Figure 4:
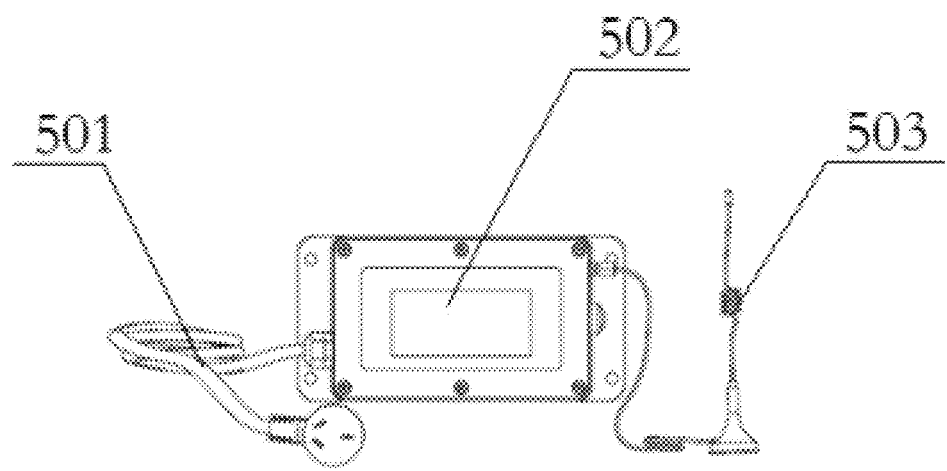
FIG. 4 is a schematic structural diagram of a first communication module according to an embodiment of the disclosure.

FIG. 4 is a schematic structural diagram of a first communication module according to an embodiment of the disclosure. As shown in FIG. 4, the first communication module may further be referred as a "pig treasure", and the first communication module 5 includes: a first input power interface 501, a first control box 502 and a data transmission antenna 503; an input end of the first input power interface 501 is connected to a power supply, namely a commercially-available power supply; an output end of the first input power interface 501 is connected to an input end of the first control box 502; an output end of the first control box 502 is connected to the data transmission antenna 503; and through the first communication module, the data transmission between the feeding module 1 and the server 4 is implemented.

Figure 5:
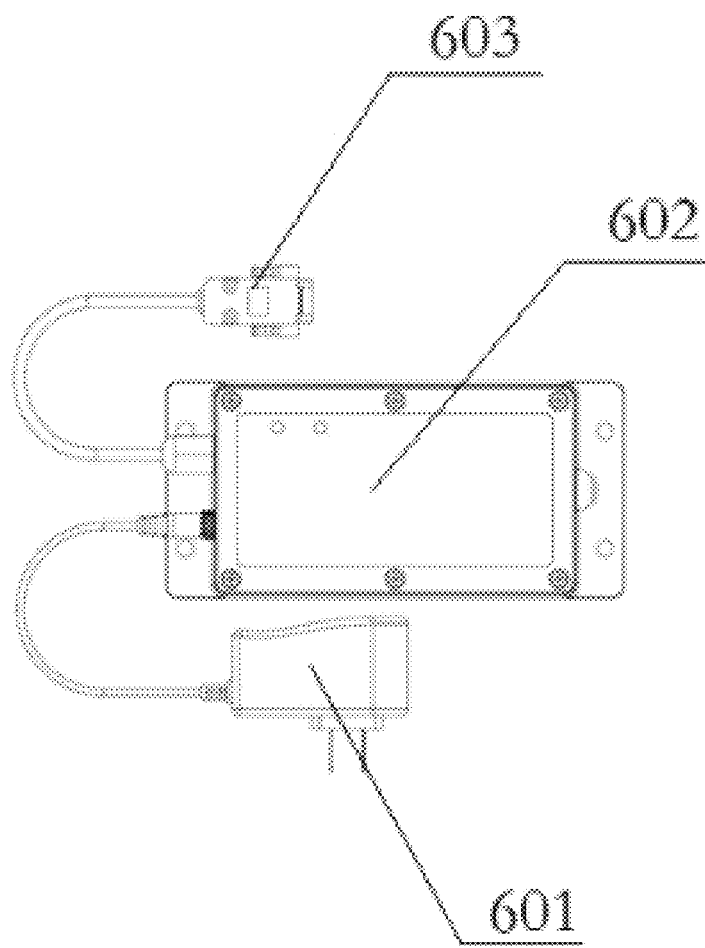
FIG. 5 is a schematic structural diagram of a second communication module according to an embodiment of the disclosure.

FIG. 5 is a schematic structural diagram of a second communication module according to an embodiment of the disclosure. As shown in FIG. 5, the second communication module 6 may further be referred to as a "scale treasure", and the second communication module 6 specifically includes: a second input power interface 601, a second control box 602 and a connection interface 603; an input end of the second input power interface 601 is connected to a power supply; an output end of the second power interface 601 is connected to an input end of the second control box 602; an output end of the second control box 602 is connected to an input end of the connection interface 603; an output end of the connection interface 603 is connected to the weighing module 3; through the second communication module 6, the data transmission between the server 4 and the weighing module 3 may be implemented; and during the data transmission process, the manual participation is completely prevented and thus the authenticity of the data may be guaranteed.

Figure 6:
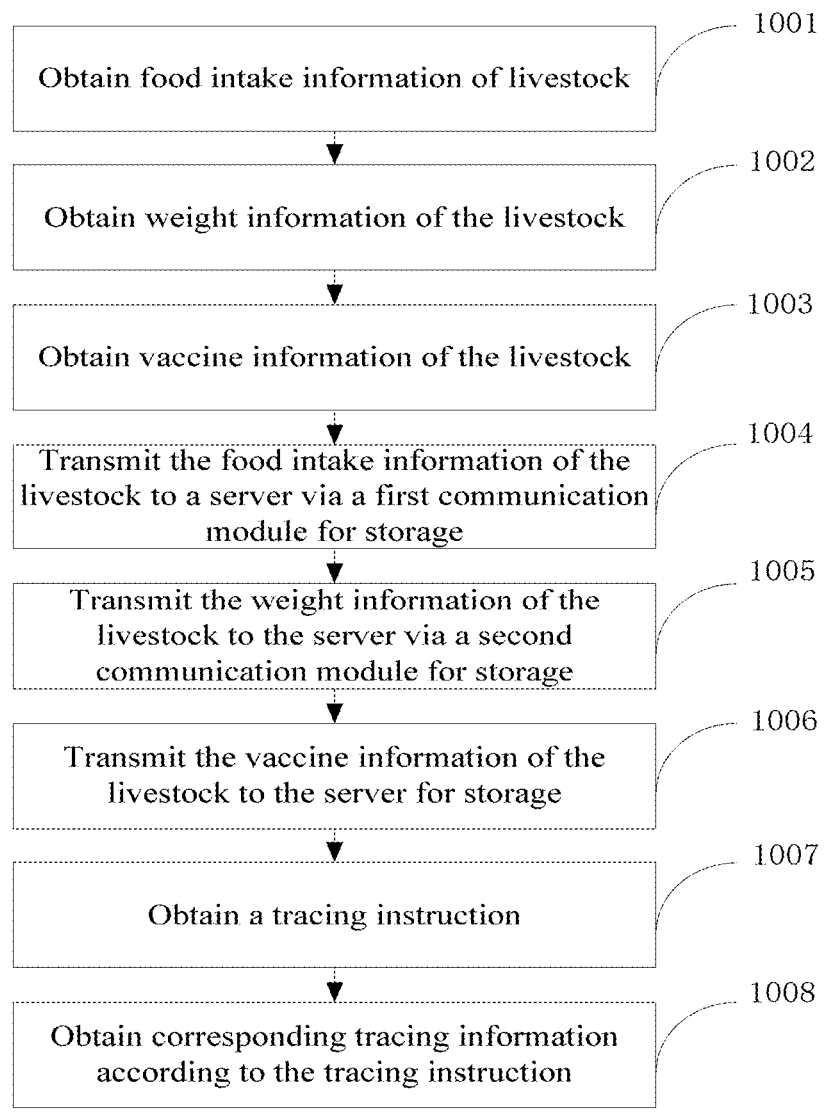
FIG. 6 is a flow chart of a livestock tracing method according to an embodiment of the present invention.

FIG. 6 is a flow chart of a livestock tracing method according to an embodiment of the present invention. As shown in FIG. 6, the method includes the following steps.

Step 1001: obtain food intake information of livestock, where the food intake information of the livestock is obtained via a feeding module.

Step 1002: obtain weight information of the livestock, where the weight information of the livestock is obtained via a weighing module.

Step 1003: obtain vaccine information of the livestock, where the vaccine information of the livestock is obtained via an adopting and purchasing module.

Step 1004: transmit the food intake information of the livestock to a server via a first communication module for storage.

Step 1005: transmit the weight information of the livestock to the server via a second communication module for storage.

Step 1006: transmit the vaccine information of the livestock to the server for storage.

Step 1007: obtain a tracing instruction.

Step 1008: obtain corresponding tracing information according to the tracing instruction.

Each embodiment of the present specification is described in a progressive manner, each embodiment focuses on the difference from other embodiments, and the same and similar parts between the embodiments may refer to each other.

Several examples are used for illustration of the principles and implementation methods of the present invention. The description of the embodiments is used to help illustrate the method and its core principles of the present invention. In addition, those skilled in the art can make various modifications in terms of specific embodiments and scope of application in accordance with the teachings of the present invention. In conclusion, the content of this specification shall not be construed as a limitation to the invention.

What is claimed is:

1. A livestock tracing system, comprising a feeding module, an adopting and purchasing module, a weighing module, a server, a first communication module and a second communication module, wherein the feeding module is configured to provide food intake information of livestock and transmit the food intake information to the server via the first communication module; wherein the feeding module includes: a pedestal, support rods, a computer, an electromagnetic valve, a charging basket, a blanking mechanism, and a tray;

the support rods are disposed on the pedestal, the electromagnetic valve and the computer are respectively disposed on upper ends of the support rods, the charging basket is disposed on upper portions of the support rods and is located below the electromagnetic valve, the blanking mechanism is disposed below the charging basket, and the tray is disposed below the blanking mechanism;

the electromagnetic valve is configured to control water supply; the charging basket is configured to store feed; the computer is configured to control the blanking mechanism to blank materials; and the tray is configured to feed poultry/livestock;

the feeding module further includes detection rods; and the detection rods are disposed between the blanking mechanism and the tray, are located on the support rods, and are configured to detect a residual amount of the feed in the tray;

the feeding module further includes a reader antenna and ear tags; the reader antenna is disposed on the blanking mechanism; the ear tags are worn on ears of the poultry/livestock; the reader antenna is cooperatively used with the ear tags, and is configured to identify the ear tags; and the ear tags represent identity information of the poultry/livestock respectively, and the identity information is unique; by identifying the ear tags via the reader antenna, a specific number of food intake livestock is obtained, and thus blanking amount is controlled and historical data are for reference;

the weighing module is configured to provide weight information of the livestock and transmit the weight information to the server via the second communication module;

the adopting and purchasing module is configured to provide vaccine information of the livestock and transmit the vaccine information to the server; and the server is configured to store the food intake information, the weight information and the vaccine information, and obtain corresponding tracing information according to a tracing look-up instruction.

2. The livestock tracing system according to claim 1, wherein the first communication module specifically comprises: a first input power interface, a first control box and a data transmission antenna; an input end of the first input power interface is connected to a power supply; an output end of the first input power interface is connected to an input end of the first control box; and an output end of the first control box is connected to the data transmission antenna.

3. The livestock tracing system according to claim 1, wherein the second communication module specifically comprises: a second input power interface, a second control box and a connection interface; an input end of the second input power interface is connected to a power supply; an output end of the second input power interface is connected to an input end of the second control box; an output end of the second control box is connected to an input end of the connection interface; and an output end of the connection interface is connected to the weighing module.

4. The livestock tracing system according to claim 1, wherein the food intake information comprises: a food intake amount of the livestock, the number of food intake times and food intake time.

5. The livestock tracing system according to claim 1, wherein the vaccine information comprises: injection varieties of vaccines, injection amounts of the vaccines and injection time of the vaccines.

6. A livestock tracing method, applied to the above livestock tracing system according to claim 1, and comprising:
    obtaining food intake information of livestock;
    obtaining weight information of the livestock;
    obtaining vaccine information of the livestock;
    transmitting the food intake information of the livestock to a server via a first communication module for storage;
    transmitting the weight information of the livestock to the server via a second communication module for storage;
    transmitting the vaccine information of the livestock to the server for storage;
    obtaining a tracing instruction; and
    obtaining corresponding tracing information according to the tracing instruction.

7. The livestock tracing method according to claim 6, wherein the food intake information of the livestock is obtained via a feeding module.

8. The livestock tracing method according to claim 6, wherein the vaccine information of the livestock is obtained via an adopting and purchasing module.

9. The livestock tracing method according to claim 6, wherein the weight information of the livestock is obtained via a weighing module.

10. A livestock tracing method, applied to the above livestock tracing system according to claim 2, and comprising:
    obtaining food intake information of livestock;
    obtaining weight information of the livestock;
    obtaining vaccine information of the livestock;
    transmitting the food intake information of the livestock to a server via a first communication module for storage;
    transmitting the weight information of the livestock to the server via a second communication module for storage;
    transmitting the vaccine information of the livestock to the server for storage;
    obtaining a tracing instruction; and
    obtaining corresponding tracing information according to the tracing instruction.

11. A livestock tracing method, applied to the above livestock tracing system according to claim 3, and comprising:
    obtaining food intake information of livestock;
    obtaining weight information of the livestock;
    obtaining vaccine information of the livestock;
    transmitting the food intake information of the livestock to a server via a first communication module for storage;
    transmitting the weight information of the livestock to the server via a second communication module for storage;
    transmitting the vaccine information of the livestock to the server for storage;
    obtaining a tracing instruction; and
    obtaining corresponding tracing information according to the tracing instruction.

12. A livestock tracing method, applied to the above livestock tracing system according to claim 4, and comprising:
    obtaining food intake information of livestock;
    obtaining weight information of the livestock;
    obtaining vaccine information of the livestock;
    transmitting the food intake information of the livestock to a server via a first communication module for storage;
    transmitting the weight information of the livestock to the server via a second communication module for storage;
    transmitting the vaccine information of the livestock to the server for storage;
    obtaining a tracing instruction; and
    obtaining corresponding tracing information according to the tracing instruction.

13. A livestock tracing method, applied to the above livestock tracing system according to claim 5, and comprising:
    obtaining food intake information of livestock;
    obtaining weight information of the livestock;
    obtaining vaccine information of the livestock;
    transmitting the food intake information of the livestock to a server via a first communication module for storage;
    transmitting the weight information of the livestock to the server via a second communication module for storage;
    the vaccine information of the livestock to the server for storage;
    obtaining a tracing instruction; and
    obtaining corresponding tracing information according to the tracing instruction.

14. The livestock tracing method according to claim 10, wherein the food intake information of the livestock is obtained via a feeding module.

15. The livestock tracing method according to claim 11, wherein the food intake information of the livestock is obtained via a feeding module.

16. The livestock tracing method according to claim 12, wherein the food intake information of the livestock is obtained via a feeding module.

17. The livestock tracing method according to claim 13, wherein the food intake information of the livestock is obtained via a feeding module.

18. The livestock tracing method according to claim 10, wherein the vaccine information of the livestock is obtained via an adopting and purchasing module.

19. The livestock tracing method according to claim 11, wherein the vaccine information of the livestock is obtained via an adopting and purchasing module.

20. The livestock tracing method according to claim 12, wherein the vaccine information of the livestock is obtained via an adopting and purchasing module.

* * * * *